(12) United States Patent
Ferro et al.

(10) Patent No.: US 9,049,141 B2
(45) Date of Patent: Jun. 2, 2015

(54) USER-CONTROLLED NETWORK VIDEO MANAGEMENT

(75) Inventors: Robert J. Ferro, Jackson, NJ (US); Luis Figueroa, Spotswood, NJ (US); David H. Lu, Morganville, NJ (US); Chen Yui Yang, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1069 days.

(21) Appl. No.: 12/341,506

(22) Filed: Dec. 22, 2008

(65) Prior Publication Data

US 2010/0161770 A1 Jun. 24, 2010

(51) Int. Cl.
| G06F 15/177 | (2006.01) |
| H04L 12/853 | (2013.01) |
| H04L 12/801 | (2013.01) |
| H04L 12/851 | (2013.01) |
| H04L 12/833 | (2013.01) |
| H04L 12/24 | (2006.01) |
| H04L 12/26 | (2006.01) |

(52) U.S. Cl.
CPC ......... *H04L 47/2416* (2013.01); *H04L 41/0213* (2013.01); *H04L 41/0896* (2013.01); *H04L 41/5022* (2013.01); *H04L 41/5025* (2013.01); *H04L 41/509* (2013.01); *H04L 43/0829* (2013.01); *H04L 43/16* (2013.01); *H04L 47/10* (2013.01); *H04L 47/2433* (2013.01); *H04L 47/2458* (2013.01)

(58) Field of Classification Search
CPC ............ H04L 41/0213; H04L 41/0896; H04L 41/5022; H04L 41/5025; H04L 47/10; H04L 47/2433; H04L 47/2441; H04L 47/2416; H04L 47/2458

USPC ............ 709/235, 221, 231; 370/395.53, 238, 370/230.1, 392, 416, 230, 252, 437, 229; 463/42; 455/450; 726/15
See application file for complete search history.

(56) References Cited

U.S. PATENT DOCUMENTS

| 6,081,524 | A | 6/2000 | Chase et al. | |
| 6,188,671 | B1 | 2/2001 | Chase et al. | |
| 6,788,681 | B1 | 9/2004 | Hurren et al. | |
| 7,027,394 | B2* | 4/2006 | Gupta et al. | 370/230.1 |
| 7,257,118 | B2 | 8/2007 | Chase et al. | |
| 2001/0047423 | A1* | 11/2001 | Shao et al. | 709/235 |
| 2004/0223499 | A1 | 11/2004 | Sanderson et al. | |
| 2004/0261116 | A1 | 12/2004 | Mckeown et al. | |
| 2006/0092963 | A1* | 5/2006 | Bakre et al. | 370/437 |
| 2006/0165103 | A1 | 7/2006 | Trudeau et al. | |
| 2006/0239188 | A1* | 10/2006 | Weiss et al. | 370/229 |
| 2006/0239288 | A1* | 10/2006 | Posey | 370/416 |
| 2008/0019371 | A1 | 1/2008 | Anschutz et al. | |
| 2008/0192629 | A1* | 8/2008 | Chari | 370/230 |
| 2008/0279111 | A1* | 11/2008 | Atkins et al. | 370/252 |
| 2008/0304485 | A1* | 12/2008 | Sinha et al. | 370/392 |
| 2009/0029777 | A1* | 1/2009 | Holt et al. | 463/42 |
| 2009/0097490 | A1* | 4/2009 | Sanderson et al. | 370/395.53 |
| 2010/0027425 | A1* | 2/2010 | Cheung et al. | 370/238 |
| 2010/0035623 | A1* | 2/2010 | Kim et al. | 455/450 |

* cited by examiner

*Primary Examiner* — Jungwon Chang
(74) *Attorney, Agent, or Firm* — Jackson Walker L.L.P.

(57) ABSTRACT

A process and system for user-controlled configuration of an Internet protocol network. The user may supply input for generating a network configuration profile, which includes a number of classes of service (COSs) for prioritizing network traffic, including video transmission. A quality of service (QOS) may be measured and compared with a COS for video transmission. Depending on the measured QOS, a network alert may be issued and a priority of packets associated with the COS for video transmission may be increased.

20 Claims, 7 Drawing Sheets

USER-CONTROLLED NETWORK VIDEO MANAGEMENT

BACKGROUND

1. Field of the Disclosure

The present disclosure relates to network configuration and, more particularly, to configuring virtual private networks for video transmission.

2. Description of the Related Art

Private networks may be configured for bandwidth, latency or security. Typically, such configuration is performed by a service provider of the network.

DESCRIPTION OF EXEMPLARY EMBODIMENTS

Figure 1:
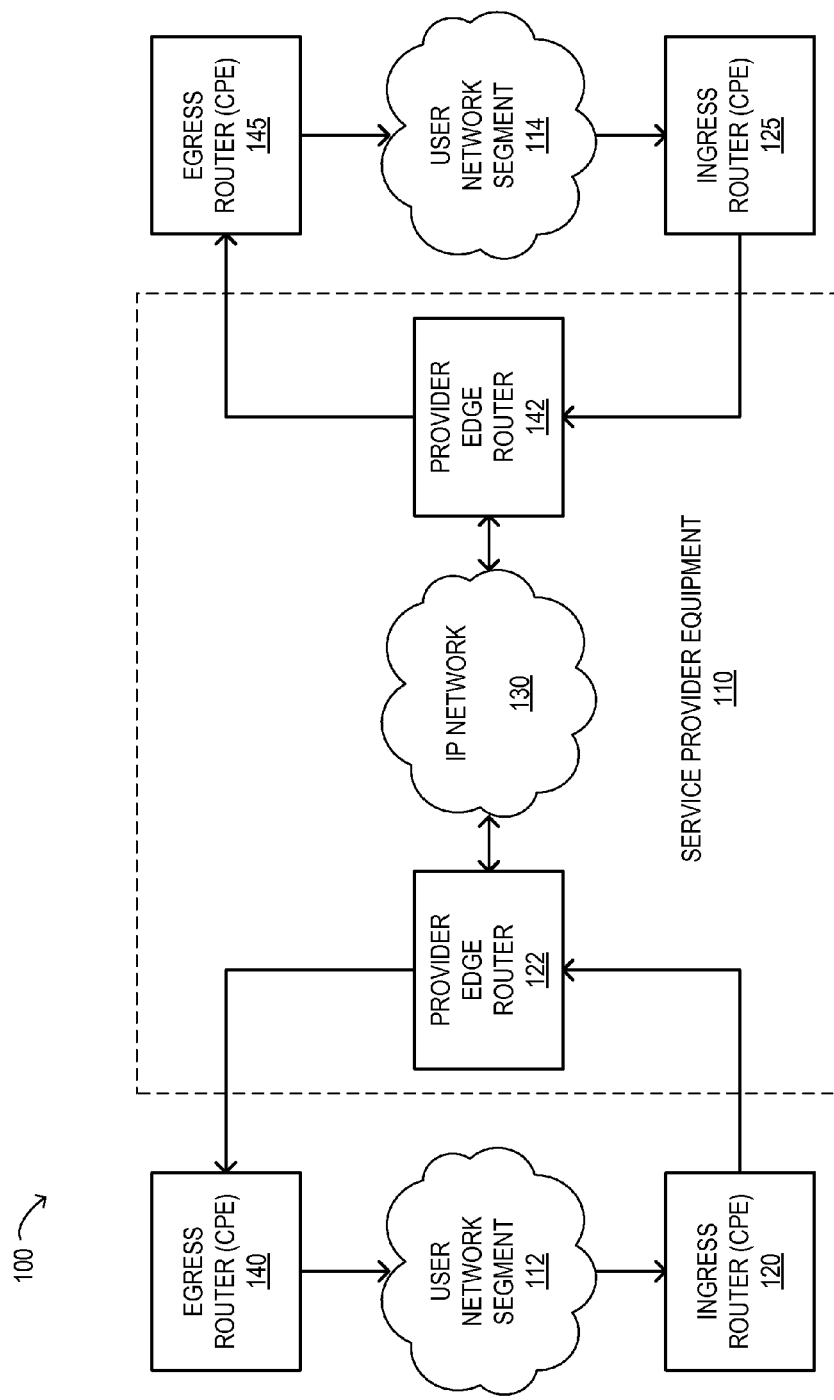
FIG. 1 is a block diagram of selected elements of an embodiment of a virtual private network.

Many entities use some form of wide-area network (WAN) to communicate and exchange data between different locations. For example, a business entity with branch offices in different cities may desire that each location be equipped with internal and external network connectivity, while sharing common functionality and applications. A common WAN solution is a virtual private network (VPN), which allows a secured, private WAN to be configured using public backbone infrastructure to access specific locations. Each location serviced by a VPN may include a local-area network (LAN), such that the VPN effectively bridges the remote LAN or other network segments.

With the advent of Internet-protocol (IP) VPNs, IP-based multimedia network services may be combined using the same network infrastructure. For example, IP-VPNs may be used to transmit video, along with email and telephony services, such as voice-over-IP (VOIP), to serve business needs for modern digital communication on a single network platform. Since IP networks are ubiquitous, the underlying IP-VPN infrastructure may operate totally transparent to user-level LANs, providing the appearance of a much larger network system.

With increasing demands on network performance, network configuration and flexibility of use, the immediate and tailored configuration of a network, such as a VPN, becomes an important feature for an administrator or user of the network. A network service provider offering network services, such as a VPN, may also provide the capability and resources to reconfigure the network according to the properties desired by their customers. However, as the demand for network configuration services increases, the availability of technical resources, such as network engineers, may remain constrained. The process of obtaining network configuration services may further be cumbersome, time-consuming, and error-prone. In some instances, users may desire to constantly reconfigure their networks for changing performance demands on an as-needed basis.

In one aspect, a disclosed method for configuring an IP network includes generating a network configuration based on user input received to generate a network configuration profile (NCP), such that packet prioritization on the network complies with the NCP for prioritizing network packets sent to the network, designating at least one of the plurality of classes of service (COSs) for video transmission, and implementing the network configuration on the network. The NCP may define a plurality of COSs, and at least one of the COSs may be defined according to a packet parameter In certain embodiments, said implementing the network configuration may include configuring packet-routing devices on the network to comply with the NCP based on the packet parameter. The first user input may be sent to a network service provider for validation, wherein said implementing is performed in response to the network service provider indicating validation of the first user input.

In some embodiments, the method further includes transmitting network packets over the network, whereby the packet parameter of transmitted network packets establishes a desired COS. At least a portion of the transmitted network packets may represent a stream of video data complying with at least one of the plurality of COSs for video transmission.

In certain instances, the packet parameter may be at least one of an IP Precedence value, a Differentiated Services Code Point (DSCP) value, a source IP address, and a destination IP address. The packet parameter may be a combination of an IP network address and a corresponding port. The transport level protocol may be a User Datagram Protocol (UDP) or a Transmission Control Protocol (TCP), while the packet parameter may be specified for at least one of a source and a destination.

In exemplary embodiments, the method further includes comparing a measured quality of service (QOS) to a COS for video transmission. The measured QOS may be based on at least one of: the number of dropped packets and the number of dropped bytes. The measured QOS may be determined for a sample period. When a difference between the measured QOS and the COS for video transmission exceeds a minimum value, the method may include allocating additional bandwidth on the network for the COS for video transmission. Implementing the network configuration may further include dropping packets received at an ingress link of the network when a received packet does not conform to the NCP.

In another aspect, a disclosed service for user-controlled network configuration of an IP-VPN includes enabling a user to provide input for generating a network configuration for the VPN, while the network configuration designates at least one COS for video transmission. The service may further include notifying a VPN service provider that the user input has been received, validating the user input based on a service contract with the service provider, and implementing the network configuration on the VPN.

In some cases, the service further includes building an NCP for prioritizing IP packets sent to the VPN, wherein the NCP includes a plurality of COSs, and wherein each COS is respectively defined based on a packet parameter. Implementing the network configuration may further include configuring routing devices on the VPN to respond to the packet parameter of each received IP packet to implement the corresponding COS.

In certain embodiments, the service further includes measuring a network QOS to determine compliance with a COS for video transmission. The measured QOS may be based on at least one of: the number of dropped packets and the number of dropped bytes. When the QOS indicates non-compliance with a selected COS of the at least one COS for video transmission, the service may include increasing bandwidth on the VPN for the selected COS for video transmission.

In a further aspect, a disclosed system for configuring an IP network includes a processor and memory media accessible to the processor, including processor executable instructions for implementing a user-controlled network configuration system. The instructions may be executable to receive user input for defining an NCP including a plurality of COSs for prioritizing network packets sent to the network, including at least one COS for video transmission, while a least some of the plurality of COSs may correspond to a respective packet parameter. The instructions may further be executable to generate a network configuration based on the NCP, and implement the network configuration, including configuring packet routing devices on the network to prioritize packet routing based on the packet parameter of transmitted network packets.

In certain instances, the instructions may be executable to respond to a measurement indicating degraded QOS for a COS for video transmission by modifying a network bandwidth associated with the COS for video transmission.

In yet a further aspect, a disclosed computer-readable memory media includes processor executable instructions for configuring a portion of a VPN based on user-provided input. The instructions included in the memory media may be executable to receive user input for defining an NCP for prioritizing network packets sent to the VPN, the NCP including a plurality of COSs, including at least one COS for video transmission, wherein each COS corresponds to a value of a packet parameter, while said prioritizing may be based on the packet parameter value. The instructions may further be executable to implement a VPN configuration based on the NCP.

In some embodiments, the memory media includes instructions executable to establish a QOS by monitoring network traffic for a COS for video transmission, including recording a measure of dropped packets. The measure of dropped packets may include at least one of: the number of dropped packets and the number of dropped bytes. The memory media may further include instructions executable to issue a network alert when the measure of dropped packets exceeds a minimum value, and respond to the network alert by increasing the priority of packets associated with the COS for video transmission.

In the following description, details are set forth by way of example to facilitate discussion of the disclosed subject matter. It should be apparent to a person of ordinary skill in the field, however, that the disclosed embodiments are exemplary and not exhaustive of all possible embodiments.

An NCP, as used herein, refers to a specification defining different COSs for prioritizing network traffic. Different regimes for the number of levels of COSs may be implemented. One example using four-levels of COS values is as follows:

COS1 Real-time;
COS2 Critical data;
COS3 Business data; and
COS4 Standard data.

Each level of COS may be assigned to a specified network performance, or a performance range. In the above example, as the COS value decreases, network priority increases, such that network bandwidth increases and latency generally decreases. COS1 and COS2 may be the values which are capable of transmitting video data streams within an acceptable margin of error. It is noted that the four-level COS regime shown above is exemplary, and that COS regimes with six, eight, or more levels of service may be implemented in other situations.

An NCP may be comprised of a weighted mixture of different COSs, depending on particular traffic patterns or business requirements of the user. Following the above example for COSs, an exemplary NCP may be assembled as follows:

5% COS1;
15% COS2;
50% COS3; and
30% COS4.

Thus, an NCP represents a desired profile for the prioritization of a total amount, i.e., 100%, of network traffic, for example, transmitted over a VPN. It is noted that the weighting of different COSs within a profile may vary widely in different instances and usage scenarios. Although in the above example, the amount of traffic is shown as a relative percent of the total traffic, in other cases, the network traffic for each COS in an NCP may also be specified using other values, such as but not limited to, amount of data, rate of data, number of connections, media type, or a combination of values. The network service provider of the VPN may offer different rates, or prices, for different COSs, such that economic criteria may also affect the selection of a desired NCP, or a particular regime for specifying the NCP.

Once the desired COSs in the NCP have been established, the network infrastructure may be programmed to implement the prioritization scheme set out in the NCP. In the case of an IP-network, prioritization of network traffic may be enforced at the packet level using a packet parameter. A packet parameter in the packet header may be detected by a network routing device and used to enforce the NCP, as will be described in detail below.

Implementing the NCP on the network may include programming ingress routing devices, which receive network traffic, to enforce the COSs defined by the NCP. Incoming packets not conforming to the NCP may be dropped by an ingress routing device. Egress routing devices may be configured according to a queuing profile, which is based on the NCP, for scheduling packets emerging from the network. Thus, even if the network transmits received packets at a higher rate than specified in the NCP, the egress routing device may hold packets to satisfy a COS.

Referring to FIG. 1, a block diagram of selected elements of an embodiment of VPN 100 is illustrated. VPN 100 may be configured to link user network segment 112 with user network segment 114. In some embodiments network segments 112 and 114 represent LANs belonging to the same business entity, but at different locations. As shown in FIG. 1, VPN 100 bridges two user network segments 112 and 114. However, in different embodiments, a plurality of user network segments (not shown in FIG. 1) may be interconnected to VPN 100 using combinations and replication of equipment depicted therein.

As referred to herein, a "user" is an administrator of user network segments 112 and 114, and may be responsible for network configuration. In some cases, user network segments 112 and 114 are IP networks serving a plurality of clients at each location (not shown in FIG. 1). In certain embodiments, user network segments 112 and 114 are further bridged or interconnected with other public or private networks, such as the Internet, wireless networks, telephony networks, etc. (not shown in FIG. 1).

User network segment 112 may be coupled to provider edge router 122 via ingress router 120 and egress router 140. Similarly, user network segment 114 may be coupled to provider edge router 142 via ingress router 125 and egress router 145. Ingress routers 120 and 125 may be responsible for receiving network traffic from user network segments 112 and 114, respectively. Egress routers 140 and 145 may be responsible for sending network traffic to user network segments 112 and 114, respectively. In certain embodiments, the functionality of an ingress router and an egress router may be combined into a single device (not shown in FIG. 1).

As shown in FIG. 1, user network segment 112, ingress router 120, and egress router 140 may represent equipment at a first location, while user network segment 114, ingress router 125, and egress router 145 may represent equipment at a second location. Ingress routers 120 and 125, along with egress routers 140 and 145, may represent customer premises equipment (CPE) provided by a service provider of VPN 100, who may also provide service provider equipment 110. Service provider equipment 110 may include provider edge routers 122 and 142, and IP network 130. In some embodiments of VPN 100, provider edge routers 122 and 142 may be co-located with CPE, or combined with CPE as a single piece of equipment (not shown in FIG. 1). In some cases, provider edge routers 122 and 142 provide network services for a plurality of VPNs to different business entities, which may each operate a plurality of network segments at different locations.

In FIG. 1, provider edge routers 122 and 142 include bidirectional routing functionality to and from IP network 130, which represents the backbone system for VPN 100. As mentioned above, IP network 130 may itself be any combination of private and public networks, such as the Internet. In one embodiment, IP network 130 may be a Multiprotocol Label Switching (MPLS) network, while provider edge routers 122 and 142 are Label Edge Routers (LERs) for the MPLS, capable of translating between an MPLS protocol and an external protocol. IP network 130 may further include a plurality of internal routing devices (not shown in FIG. 1). Although IP network 130 is shown as included in service provider equipment 110 in FIG. 1, IP network 130 may include third-party equipment or network segments, for example, network routing devices, acquired by the service provider of VPN 100.

In one embodiment, VPN 100, as shown in FIG. 1, once configured according to a desired NCP by a user, may transmit packets between user network segments 112 and 114. In one example of transmission of network traffic from user network segment 112 to user network segment 114, network packets may be received at ingress routers 120 from user network segment 112. The ingress router 120 may enforce the desired NCP by dropping network packets not conforming to the NCP. The conforming network packets may be routed via provider edge router 122, transmitted by IP network 130 to provider edge router 142, and sent to egress router 145. The network packets may be queued by egress router 145 and scheduled for transmission to user network segment 114 when they comply with the NCP. A similar operation may be performed for transmitting network packets in the reverse direction in VPN 100.

Figure 2:
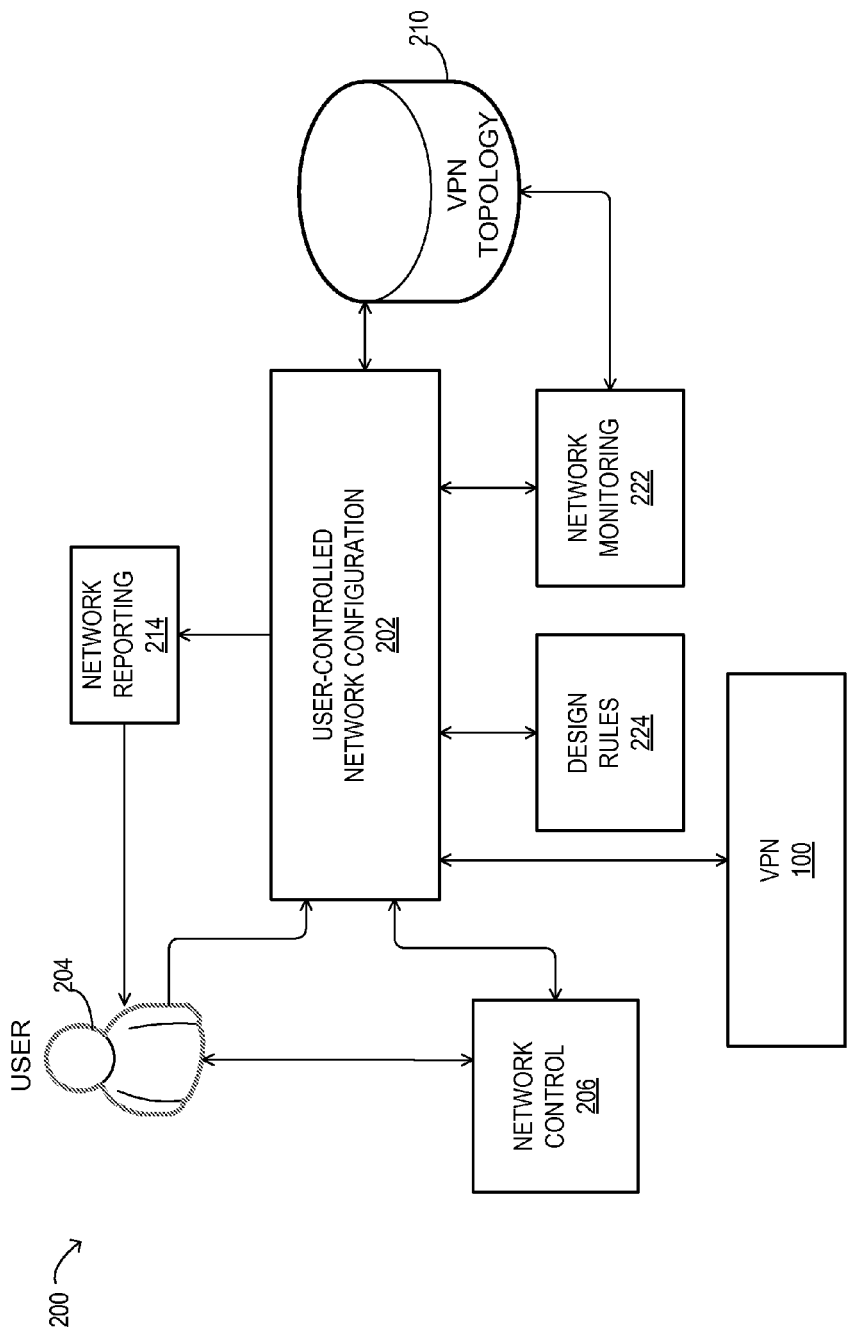
FIG. 2 is a block diagram of selected elements of an embodiment of a user-controlled network configuration.

Referring now to FIG. 2, a block diagram of selected elements of an embodiment of a network configuration system 200 is illustrated. As shown in FIG. 2, a user-controlled network configuration module 202, referred to herein as "configuration module" 202, is coupled to VPN 100 (see FIG. 1), and may be configured to implement an NCP for VPN 100. Configuration module 202 may receive input from user 204, who may be an administrative user of VPN 100, for generating a desired NCP.

Configuration module 202 as shown in FIG. 2 may further be coupled to network control 206, which may also directly be contacted by user 204. Network control 206 may represent a support organization for the service provider of VPN 100, and may be equipped to implement NCPs on VPN 100, as well as validate and/or modify user-generated NCPs. In some embodiments, network control 206 represents a call center staffed by operators and qualified technical experts for providing support to user 204. In some cases, network control 206 represents the service provider of VPN 100 for business issues, such as billing, terms of service contracts, payment, technical support, equipment supply and installation, etc.

Configuration module 202 may further access design rules 224 for providing options for COSs and NCPs to user 204. Design rules 224 may include rules for COS regimes offered by the service provider of VPN 100. In some cases, design rules 224 are used to determine whether a desired NCP is valid for implementation on VPN 100.

Also shown in FIG. 2 is VPN topology 210, which may be a data store for configuration information associated with VPN 100. In some embodiments, VPN topology 210 stores NCPs for a plurality of network ingress links, and queuing profiles for a plurality of network egress links. VPN topology 210 may also store additional network connectivity information for network links, such as routing and/or switching devices, for VPN 100. In some cases, VPN topology 210 may be used to generate specific configuration information for network equipment in VPN 100, based on an NCP for a given set of ingress and egress links. Accordingly configuration module 202 may access VPN topology 210 for obtaining user-specific information used in generating user input options, and for implementing an NCP on VPN 100 generated using user input.

Still further shown in FIG. 1 is network monitoring 222, which may be coupled to configuration module 202 and VPN topology 210. Network monitoring 222 may be configured to test and measure actual network performance, and thus maintain information on the current condition of VPN 100. Network monitoring 222 may monitor network traffic to determine when and where network disturbances occur. Network monitoring 222 may also perform QOS testing for quantitative and statistical evaluation of the performance of VPN 100.

In FIG. 1, user 204 may access network reporting 214 to generate reports on network performance, network disruptions, network conditions and network traffic. In one embodiment, a user may specify a given COS in a currently implemented NCP, and then obtain a report on QOS for that COS on VPN 100. In this manner, user 204 is enabled to verify that the NCP generated and implemented using user input is actually performed as expected. Configuration module 202 may provide network reporting 214 with information to generate reports that quantify the deviation in performance between a desired COS and a measured QOS. In one embodiment, configuration module 202 obtains QOS testing results obtained from network monitoring 222 and provides these to network reporting 214.

Figure 3:
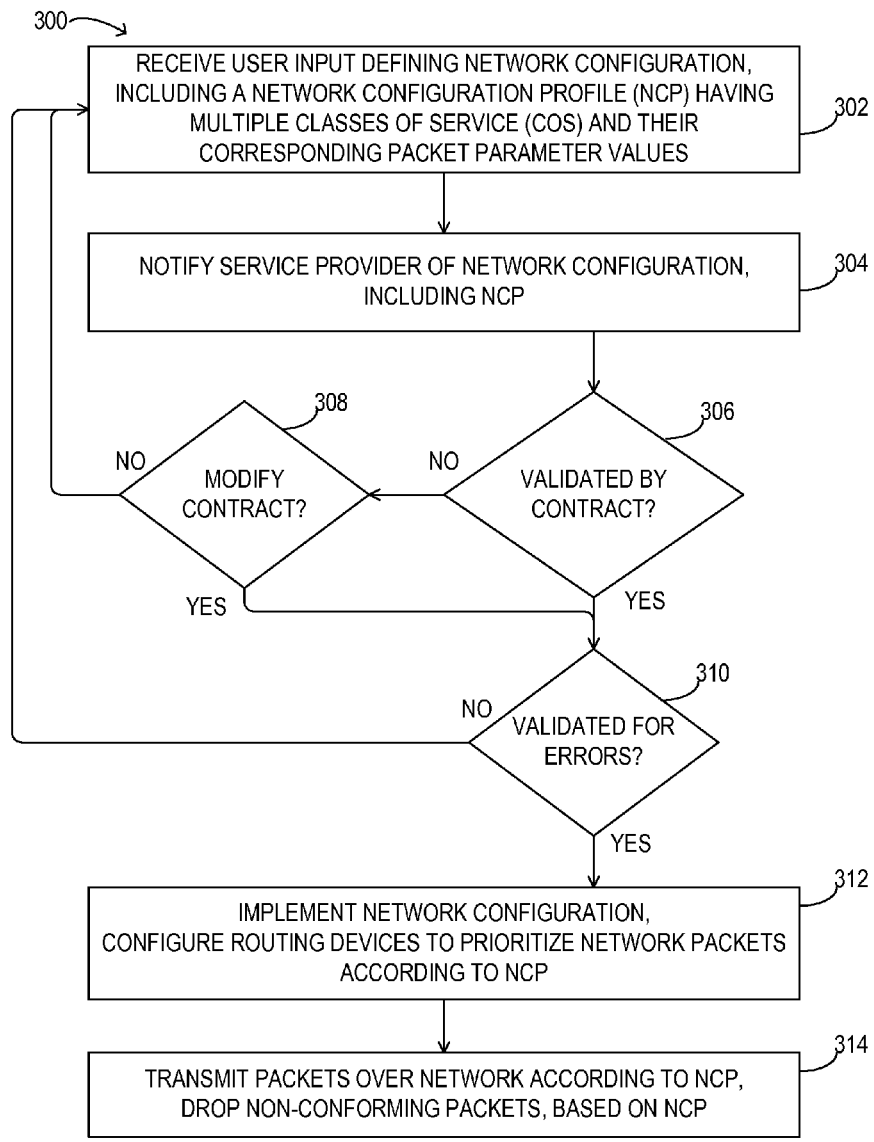
FIG. 3 is a block diagram of selected elements of an embodiment of a network configuration process.

Referring now to FIG. 3, a block diagram of selected elements of an embodiment of a network configuration process 300 is depicted. In one embodiment, configuration module 202 (see FIG. 2) is configured to execute process 300. User 204 may provide input or commands for guiding and facilitating the execution of process 300, based on a service contract with a service provider of VPN 100.

Accordingly, user input defining a network configuration, including an NCP of multiple COSs along with corresponding packet parameters, is received (operation 302). User 204 may specify different kinds of packet parameters to define COSs in operation 302, as will be discussed in detail below (see FIG. 5). A desired NCP may be specified for VPN 100 using a user-interface provided to user 204 in operation 302. In addition to the NCP, the network configuration may define access points and locations for connection using VPN 100. The service provider (for VPN 100) may be notified of the network configuration, including the desired NCP (operation 304). A decision is made whether or not the network configuration, including the NCP, is validated by the service contract (operation 306). If the result of operation 306 is NO, then a further decision is made whether or not to modify the service contract (operation 308). If the result of operation 308 is NO, then process 300 returns to operation 302. If the result of operation 306 is YES, or the result of operation 308 is YES, then a further decision is made whether or not the network configuration, including the NCP, has been validated for errors (operation 310). If the result of operation 310 is NO, then process 300 returns to operation 302.

If the result of operation 310 is YES, then the network configuration is implemented, and routing devices in VPN 100 are configured to prioritize network packets according to the NCP (operation 312). In some embodiments, a queuing profile for scheduling packets from VPN 100 is generated based on the NCP in operation 312. Ingress routing devices may be configured according to the NCP and egress routing devices may be configured according to the queuing profile in operation 312, as will be described in further detail below (see FIG. 4). Packets may be transmitted over the network according to the NCP, such that non-confirming packets are dropped (operation 314). In one embodiment, non-conforming packets are dropped by ingress routing devices to enforce the NCP in operation 314.

Figure 4:
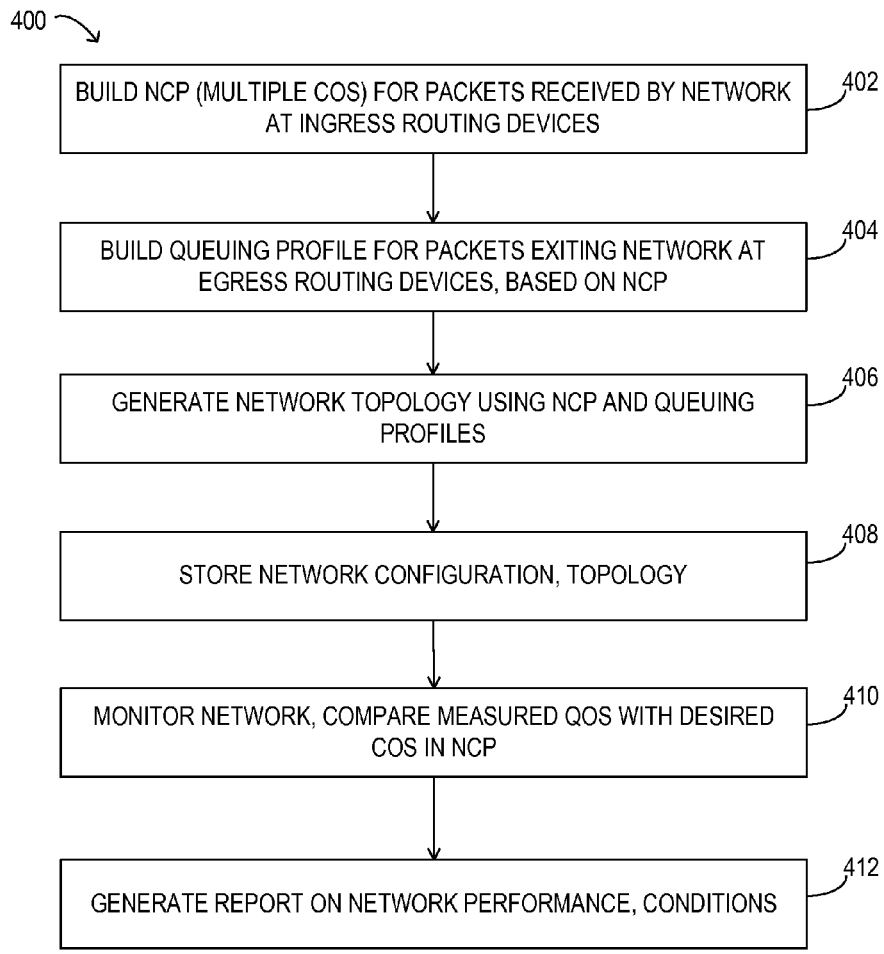
FIG. 4 is a block diagram of selected elements of an embodiment of a network configuration process.

Turning now to FIG. 4, a block diagram of selected elements of an embodiment of a network configuration process 400 is illustrated. In some embodiments, process 400 represents operations that are performed during operation 314 in process 300 (see FIG. 3). Configuration module 202 (see FIG. 2) may be configured to execute process 400 using input from user 204.

An NCP, including multiple COSs, for packets received by the network (such as VPN 100) at ingress routing devices is built (operation 402). Based on the NCP, queuing profiles for packets exiting the network at egress routing devices are built (operation 404). The queuing profiles may define how received packets are held until scheduled for release, such that traffic transmitted by VPN 100 conforms to the NCP. A network topology may be generated using the NCP and queuing profiles (operation 406). In some cases, the network topology includes NCPs for a plurality of network routing devices. The network configuration and the network topology may be stored (operation 408). The network may be monitored and a measured QOS may be compared with a desired COS in the NCP (operation 410). A report may be generated on network performance and network conditions (operation 412). In some embodiments, the report includes the QOS comparison generated in operation 410.

Figure 5:
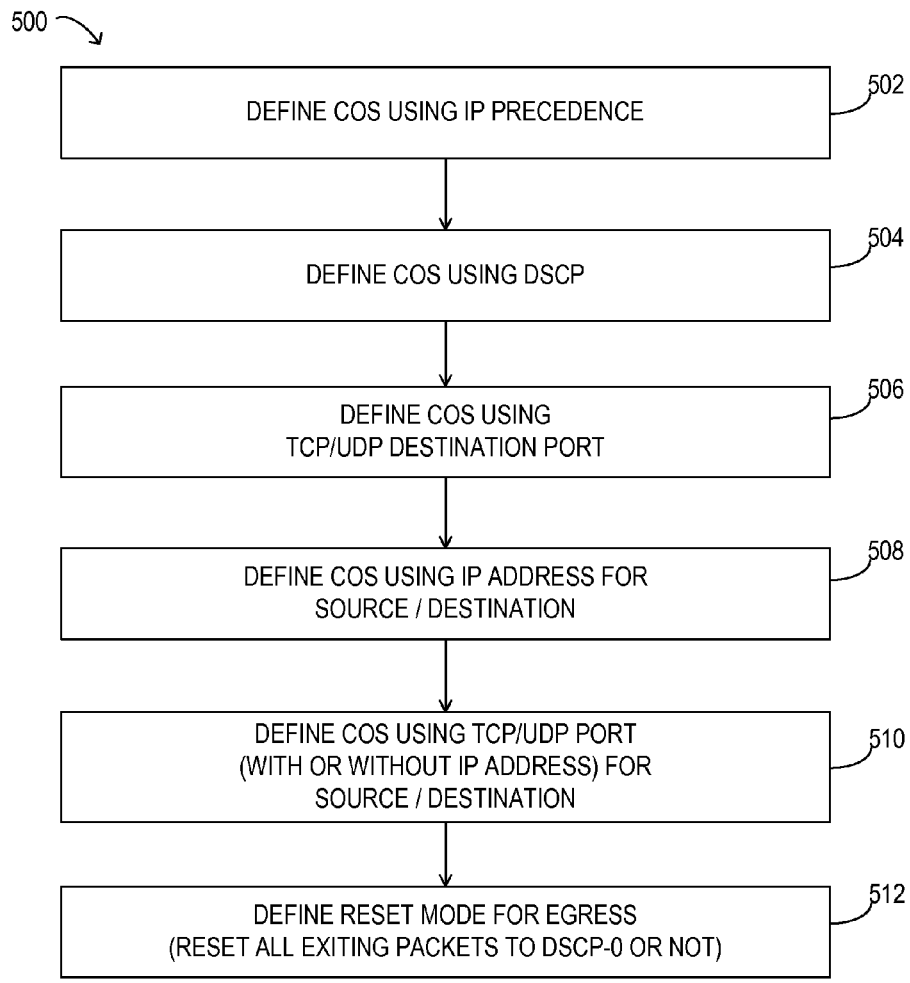
FIG. 5 is a block diagram of selected elements of an embodiment of a network configuration process.

Referring now to FIG. 5, a block diagram of selected elements of an embodiment of a network configuration process 500 is illustrated. In some embodiments, process 500 represents operations that are performed during operation 404 in process 400 (see FIG. 4). Configuration module 202 (see FIG. 2) may be configured to execute process 500 using input from user 204. Process 500 describes packet parameters that may be used to define a COS in the NCP. It is noted that certain operations illustrated in process 500 may be omitted or selectively combined in different implementations.

A COS may be defined using IP Precedence values (operation 502). IP Precedence is a 3-bit field in an IP packet header that may be used as a packet parameter to identify the COS a packet receives in the network. A COS may be defined using a DSCP (operation 504). A DSCP is a 6-bit field in an IP packet header that may be used as a packet parameter to identify the COS a packet receives in the network. A COS may be defined using a TCP/UDP destination port (operation 506). When using TCP/UDP protocols, the destination port field may serve as a packet parameter as defined in operation 506. A COS may be defined using an IP address for the source and/or destination (operation 508). The IP source or destination address may be used as a packet parameter as specified in operation 508. A COS may be defined using a TCP/UDP port, either with or without an IP address, for the source and/or destination (operation 510). When using TCP/UDP protocols, combinations of IP address and port fields, for sources and/or destinations, may be used as packet parameters in operation 510. A reset mode at network egress may be defined, such that all exiting packets may be reset to a DSCP-0 value, or not (operation 512).

Figure 6:
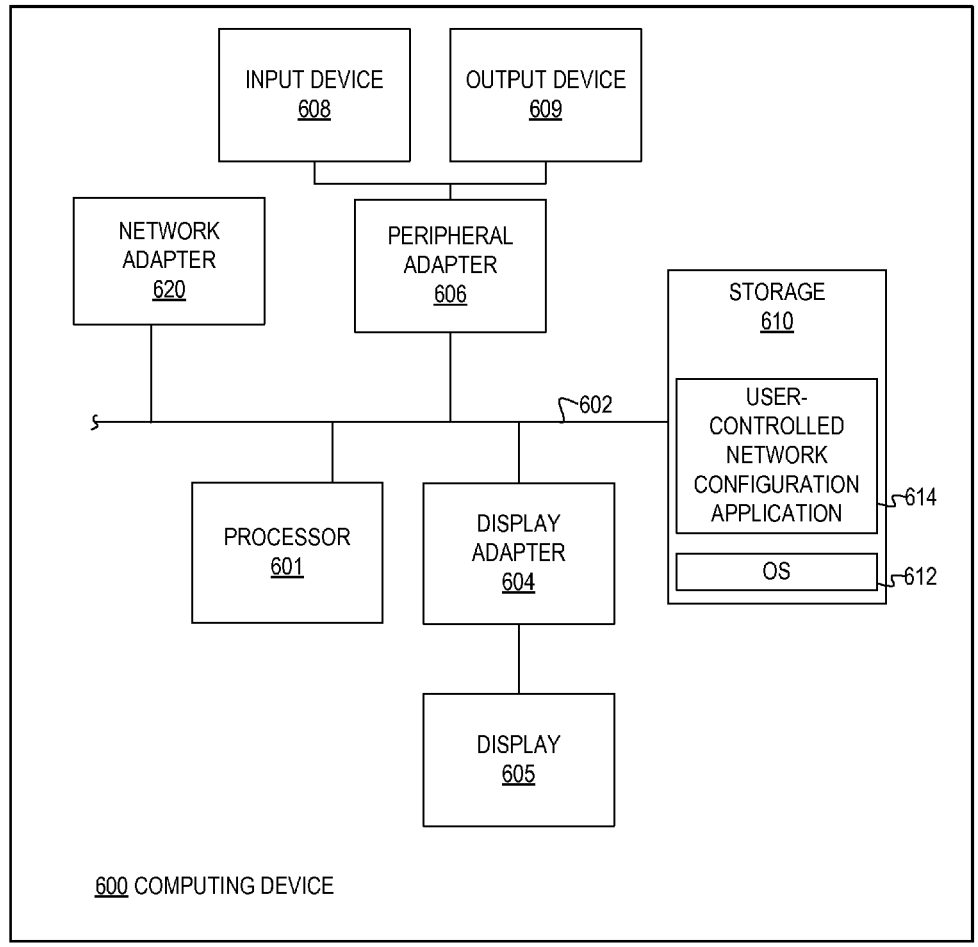
FIG. 6 is a block diagram of selected elements of an embodiment of a computing device.

Referring now to FIG. 6, a block diagram illustrating selected elements of an embodiment of a computing device 600 is presented. In the embodiment depicted in FIG. 6, device 600 includes processor 601 coupled via shared bus 602 to storage media collectively identified as storage 610.

Device 600, as depicted in FIG. 6, further includes network adapter 620 that interfaces device 600 to a network (not shown in FIG. 6). In embodiments suitable for user-controlled network configuration, device 600, as depicted in FIG. 6, may include peripheral adapter 606, which provides connectivity for the use of input device 608 and output device 609. Input device 608 may represent a device for user input, such as a keyboard or a mouse, or even a video camera. Output device 609 may represent a device for providing signals or indications to a user, such as loudspeakers for generating audio signals.

Device 600 is shown in FIG. 6 including display adapter 604 and further includes a display device or, more simply, a display 605. Display adapter 604 may interface shared bus 602, or another bus, with an output port for one or more displays, such as display 605. Display 605 may be implemented as a liquid crystal display screen, a computer monitor, a television or the like. Display 605 may comply with a display standard for the corresponding type of display. Standards for computer monitors include analog standards such as video graphics array (VGA), extended graphics array (XGA), etc., or digital standards such as Digital Visual Interface (DVI), high definition multimedia interface (HDMI), among others. A television display may comply with standards such as National Television System Committee (NTSC), Phase Alternating Line (PAL), or another suitable standard. Display 605 may include an output device 609, such as one or more integrated speakers to play audio content, or may include an input device 608, such as a microphone or video camera.

Storage 610 encompasses persistent and volatile media, fixed and removable media, and magnetic and semiconductor media. Storage 610 includes computer-readable memory media operable to store instructions, data, or both. Storage 610 as shown includes sets or sequences of instructions, namely, an operating system 612, and a user-controlled network configuration application 614. Operating system 612 may be a UNIX or UNIX-like operating system, a Windows® family operating system, or another suitable operating system.

In some embodiments, storage 610 is configured to store and provide executable instructions for user-controlled network configuration, as mentioned previously. As shown in FIG. 6, device 600 is configured in some embodiments to execute instructions for user-controlled network configuration using user-controlled network configuration application 614, analogous to process 300 depicted in FIG. 3. In some cases, configuration module 202 in FIG. 2 is embodied by device 600, or by user-controlled network configuration application 614.

Figure 7:
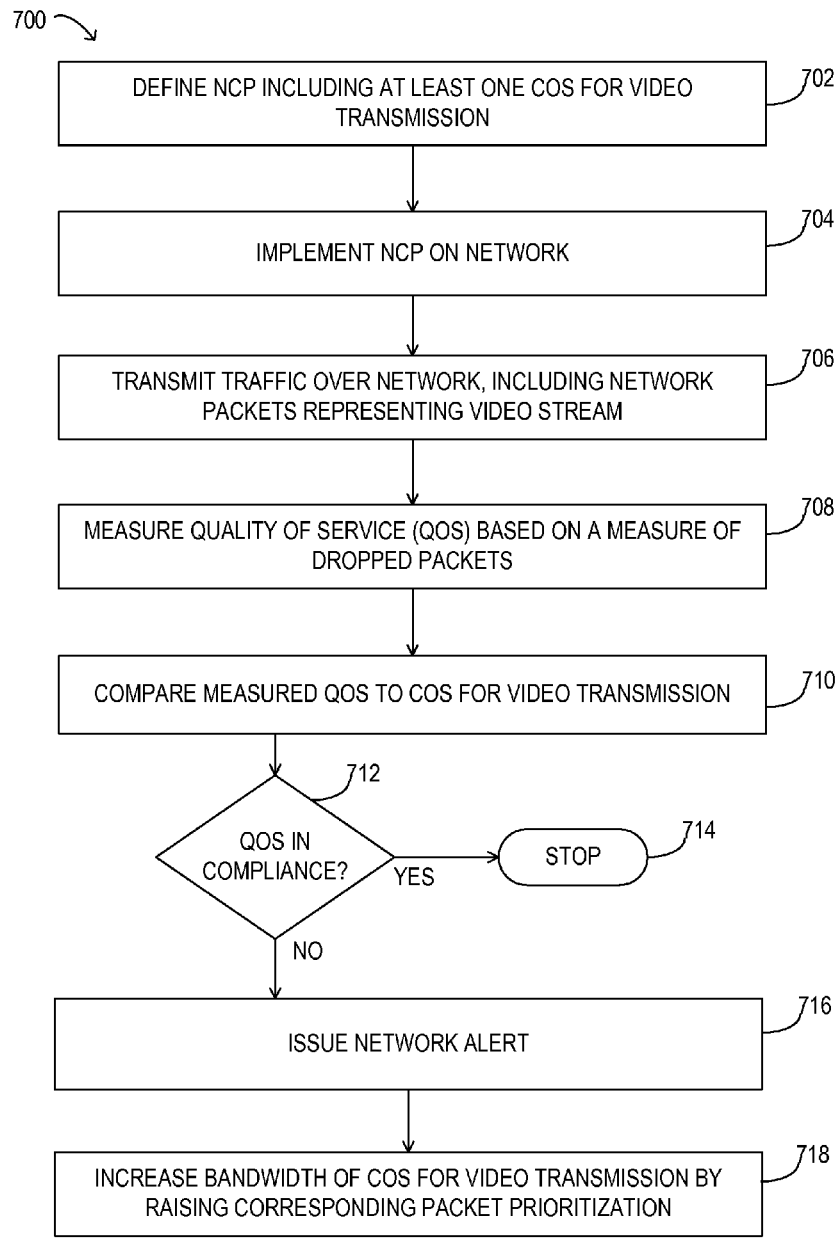
FIG. 7 is a block diagram of selected elements of an embodiment of a network configuration process.

Turning now to FIG. 7, a block diagram of selected elements of an embodiment of a network configuration process 700 is illustrated. It is noted that, in some embodiments, user-controlled network configuration application 614 may be configured to perform process 700.

An NCP, including at least one COS for video transmission, may be defined (operation 702). The NCP may then be implemented on the network (operation 704). In one example, at least some portions of process 400 (see FIG. 4) and process 500 (see FIG. 5) may be performed during operation 702 and/or 704. Traffic may be transmitted over the network, including network packets representing a video stream (operation 706). The video stream may correspond to the at least one COS for video transmission.

A QOS, based on a measure of dropped packets, may be measured (operation 708). The QOS may correspond to a particular COS, such as the COS for video transmission. The measure of dropped packets may be at least one of a number of dropped packets and a number of dropped bytes. Excessive dropped packets may be detected by sending out Simple Network Management Protocol (SNMP) queries to monitor network-attached devices, such as packet routing devices on the network. In one embodiment, SNMP queries are sent to obtain Management Information Base (MIB) values for a QOS corresponding to a real-time COS, such as the COS for video transmission. The MIB values may include the number of dropped packets and the number of dropped bytes in a given time period.

The measured QOS may be compared to the COS for video transmission (operation 710). The measure of dropped packets may be compared against a minimum value for dropped packets over a given time period, for example, five minutes in operation 710. A decision is then made, whether or not the QOS is in compliance (operation 712). In some cases, a QOS that indicates a measure of actual dropped packets greater than that specified by the COS for video transmission is taken as a sign of non-compliance. In some instances, a measure of dropped packets may also be referenced to a threshold value above a real-time COS specification, whereby non-compliance of the QOS with the COS is found if the threshold value is exceeded. In some cases, portions of method 700 may be repeated for different values of the minimum value or the threshold value.

If the result of operation 712 is YES, then method 700 may stop (operation 714). This may indicate that the QOS was found to be compliant with the COS for video transmission. If the result of operation 712 is NO, then a network alert may be issued (operation 716). The network alert may signal packet routing devices that the COS for video transmission is not forwarding packets at a desired rate. The bandwidth of the COS for video transmission may be increased by raising the corresponding packet prioritization (operation 718). In some cases, a network priority associated with a packet parameter value for the COS for video transmission is increased in operation 718. The increased network priority may be implemented on network packet routing devices. The allocation of additional bandwidth may be implemented for one or more real-time COSs that are used for video transmission.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A network configuration method, the method comprising:
   generating, based on user input from a user of a user segment of an IP network, a network classification profile defining a plurality of service classes, wherein the plurality of service classes includes a first class of service designated for video streams;
   generating a queuing profile based on the network classification profile;
   configuring an ingress router of the user segment to prioritize and drop traffic intended for a provider edge router in accordance with the network classification profile;
   configuring an egress router of the user segment to schedule traffic received from the provider edge router in accordance with the queuing profile;
   wherein the service classes are indicated via a packet parameter; and
   wherein the packet parameter comprises a destination port of the transmission level protocol.

2. The method of claim 1, wherein a transport level protocol of the IP network is selected from a user data protocol and a transmission control protocol.

3. The method of claim 1, further comprising sending the user input to a network service provider for validation, and wherein configuring the ingress router and the egress router occurs in response to the network service provider indicating validation of the user input.

4. The method of claim 1, further comprising:
   transmitting network packets over the IP network, wherein a value of the packet parameter of transmitted network packets establishes a desired service class, and wherein a portion of the transmitted network packets includes a stream of video data complying with the first class of service.

5. The method of claim 4, wherein the packet parameter includes the transmission protocol destination port in combination with a destination IP address.

6. The method of claim 1, further comprising:
   comparing a measured quality of service to a quality of service associated with the first class of service.

7. The method of claim 6, wherein the measured quality of service is based on at least one of: a number of dropped packets and a number of dropped bytes.

8. The method of claim 6, wherein the measured quality of service is determined for a sample period, the method further comprising:
   issuing a network alert if the measured quality of service does not comply with the quality of service associated with the first class of service within the sample period.

9. The method of claim 8, further comprising:
   when a difference between the measured quality of service and the quality of service associated with the first class of service exceeds a minimum value, allocating additional bandwidth on the network for the first class of service.

10. The method of claim 1, wherein configuring the ingress router includes comprises:
    dropping packets received at an ingress link of the network when a received packet does not conform to the network configuration profile.

11. A network configuration method, comprising:
receiving user input indicating a network classification profile for the virtual private network, wherein the network classification profile defines a plurality of service classes including a first class of service for video data;
generating a queuing profile based on the network classification profile;
configuring an ingress router of the virtual private network to prioritize traffic intended for a provider edge router in accordance with the network classification profile;
configuring an egress router of the virtual private network to schedule traffic received from the provider edge router in accordance with the queuing profile;
wherein the service classes are indicated via a packet parameter; and
wherein the packet parameter comprises a destination port of the transmission level protocol.

12. The method of claim 11, further comprising:
measuring a network quality of service to determine compliance with a quality of service associated with the first class of service.

13. The method of claim 12, wherein the network quality of service is based on at least one of: a number of dropped packets and a number of dropped bytes.

14. The method of claim 13, further comprising:
when the quality of service indicates non-compliance with the first class of service, increasing bandwidth on the virtual private network for the first class of service.

15. A system for configuring an IP network, the system comprising:
a processor; and
memory media, accessible to the processor, including program instructions, executable by the processor, that, when executed by the processor, cause the processor to perform operations, comprising:
generating, based on user input from a user of a user segment of an IP network, a network classification profile defining a plurality of service classes, wherein the plurality of service classes includes a first class of service designated for video streams; and
generating a queuing profile based on the network classification profile;
configuring an ingress router of the user segment to prioritize traffic intended for a provider edge router in accordance with the network classification profile;
configuring an egress router of the user segment to schedule traffic received from the provider edge router in accordance with the queuing profile;
wherein the service classes are indicated via a packet parameter; and
wherein the packet parameter comprises a destination port of the transmission level protocol.

16. The system of 15, wherein the operations include:
responding to a measurement indicating degraded quality of service for the first class of service by modifying a network bandwidth associated with the first class of service.

17. Computer-readable memory including stored program instructions, executable by the processor, that, when executed by the processor, cause the processor to perform operations comprising:
generating, based on user input from a user of a user segment of an IP network, a network classification profile defining a plurality of service classes, wherein the plurality of service classes includes a first class of service designated for video streams;
generating a queuing profile based on the network classification profile;
configuring an ingress router of the user segment to prioritize traffic intended for a provider edge router in accordance with the network classification profile;
configuring an egress router of the user segment to schedule traffic received from the provider edge router in accordance with the queuing profile;
wherein the service classes are indicated via a packet parameter; and
wherein the packet parameter comprises a destination port of the transmission level protocol.

18. The memory of claim 17, wherein the operations include:
establishing a quality of service by recording a measure of dropped packets associated with a particular video stream.

19. The memory of claim 18, wherein the measure of dropped packets includes at least one of: a number of dropped packets and a number of dropped bytes.

20. The memory of claim 18, wherein the operations include:
issuing a network alert when the measure of dropped packets exceeds a minimum value; and
responding to the network alert by increasing the priority of packets associated with the first class of service.

* * * * *